US012801362B2

(12) United States Patent
Singh et al.

(10) Patent No.: US 12,801,362 B2
(45) Date of Patent: Nov. 17, 2026

(54) CONTROLLING DEPLOYMENT OF SOFTWARE UTILIZING MACHINE LEARNING-BASED SOFTWARE DEFECT PREDICTION

(71) Applicant: Dell Products L.P., Round Rock, TX (US)

(72) Inventors: Balaji Singh, Chennai (IN); Saurabh Kejriwal, Raipur (IN)

(73) Assignee: Dell Products L.P., Round Rock, TX (US)

( * ) Notice: Subject to any disclaimer, the term of this patent is extended or adjusted under 35 U.S.C. 154(b) by 299 days.

(21) Appl. No.: 18/667,452

(22) Filed: May 17, 2024

(65) Prior Publication Data

US 2025/0355655 A1 Nov. 20, 2025

(51) Int. Cl.

| | |
|---|---|
| ***G06F 8/60*** | (2018.01) |
| ***G06F 8/61*** | (2018.01) |
| ***G06N 20/00*** | (2019.01) |
| ***G06Q 10/10*** | (2023.01) |

(52) U.S. Cl.
CPC .................................... *G06F 8/61* (2013.01)

(58) Field of Classification Search
None
See application file for complete search history.

(56) References Cited

U.S. PATENT DOCUMENTS 10,917,520 B1 * 2/2021 T. G .................... H04M 3/5233
12,026,480 B2 * 7/2024 Pereira da Silva .... G06N 3/088
12,088,328 B1 * 9/2024 Bordignon .......... H03M 7/3059
12,487,913 B2 * 12/2025 Mishra ................ G06F 11/3688
2021/0132926 A1 * 5/2021 Wangikar ................ H04L 67/34
2021/0342146 A1 * 11/2021 Ignatyev ................... G06F 8/77
2023/0017316 A1 * 1/2023 Kulkarni .................. G06N 5/04
2024/0126678 A1 * 4/2024 Blazhiyevskiy .......... G06F 8/70

(Continued)

OTHER PUBLICATIONS

S. J. Taylor et al., "Forecasting at Scale," The American Statistician, Jan. 13, 2017, 17 pages.

(Continued)

*Primary Examiner* — S. Sough
*Assistant Examiner* — Mohammad H Kabir
(74) *Attorney, Agent, or Firm* — Ryan, Mason & Lewis, LLP

(57) ABSTRACT

An apparatus comprises at least one processing device configured to generate a first data structure comprising a set of features characterizing software defects encountered and software stories generated for one or more pieces of software over a first period of time. The at least one processing device is also configured to generate, utilizing at least one time series forecasting machine learning model that takes as input the first data structure, a second data structure characterizing predicted software defects for the one or more pieces of software over a second period of time. The at least one processing device is further configured to control deployment, during at least a portion of the second period of time, of at least one of the one or more pieces of software on one or more information technology assets of an information technology infrastructure based at least in part on the second data structure.

20 Claims, 22 Drawing Sheets

(56) References Cited

U.S. PATENT DOCUMENTS

2024/0311650 A1 * 9/2024 Rahimi .................. G06N 20/20

OTHER PUBLICATIONS

B. N. Oreshkin et al., "N-BEATS: Neural Basis Expansion Analysis for Interpretable Time Series Forecasting," arXiv:1905.10437v4, Feb. 20, 2020, 31 pages.

C. Challu et al., "N-HITS: Neural Hierarchical Interpolation for Time Series Forecasting," arXiv:2201.12886v6, Nov. 29, 2022, 18 pages.

Microsoft, "What is Azure DevOps?" https://learn.microsoft.com/en-us/azure/devops/user-guide/what-is-azure-devops?view=azure-devops&toc=%2Fazure%2Fdevops%2Fget-started%2F%E2%80%A6, Feb. 1, 2024, 3 pages.

Sktime, "AutoARIMA," https://www.sktime.net/en/latest/api_reference/auto_generated/sktime.forecasting.arima.AutoARIMA.html, Accessed May 16, 2024, 38 pages.

The SQLNET Company, "XGBoostRegressor," https://docs.getml.com/1.1.0/api/getml.predictors.XGBoostRegressor.html, Accessed May 16, 2024, 7 pages.

* cited by examiner

500

| ID | WORK ITEM | TITLE | STATE | APPLICATION | TYPE | CREATED DATE |
|---|---|---|---|---|---|---|
| ID1 | DEFECT | TITLE1 | DEFERRED | APPLICATION1 | CODE DEFECT | DATE1 |
| ID2 | DEFECT | TITLE2 | COMPLETE | APPLICATION2 | CODE DEFECT | DATE2 |
| ID3 | DEFECT | TITLE3 | CLOSED | APPLICATION2 | ENVIRONMENT DEFECT | DATE3 |
| ID4 | DEFECT | TITLE4 | CANCELED | APPLICATION3 | CODE DEFECT | DATE4 |
| ID5 | DEFECT | TITLE5 | CLOSED | APPLICATION4 | CONTENT DEFECT | DATE5 |
| ... | ... | ... | ... | ... | ... | ... |

⇩

505

| | UNNAMED | TIMESTAMP | NUMBER OF DEFECTS |
|---|---|---|---|
| 0 | 0 | 2015-08-11 | 1 |
| 1 | 1 | 2015-08-12 | 0 |
| 2 | 2 | 2015-08-13 | 0 |
| 3 | 3 | 2015-08-14 | 0 |
| 4 | 4 | 2015-08-15 | 0 |
| ... | ... | ... | ... |
| 2890 | 2890 | 2023-07-10 | 7 |
| 2891 | 2891 | 2023-07-11 | 12 |
| 2892 | 2892 | 2023-07-12 | 11 |
| 2893 | 2893 | 2023-07-12 | 12 |
| 2894 | 2894 | 2023-07-14 | 2 |

FIG. 5

600

| ID | WORK ITEM | TITLE | APPLICATION | CLOSED DATE | DEPLOYED DATE | REQUIREMENT TYPE | SIZE |
|---|---|---|---|---|---|---|---|
| ID1 | STORY | TITLE1 | APPLICATION1 | DATE1 | DATE2 | USER | 5 |
| ID2 | STORY | TITLE2 | APPLICATION1 | DATE3 | DATE4 | USER | 2 |
| ID3 | STORY | TITLE3 | APPLICAITON2 | DATE5 | DATE6 | SPIKE | 1 |
| ID4 | STORY | TITLE4 | APPLICATION3 | DATE7 | DATE8 | USER | 3 |
| .. | ... | ... | ... | ... | ... | ... | ... |

⇩

605

| | UNNAMED | TIMESTAMP | NUMBER OF DEFECTS |
|---|---|---|---|
| 0 | 0 | 2015-08-11 | 3 |
| 1 | 1 | 2015-08-12 | 2 |
| 2 | 2 | 2015-08-13 | 0 |
| 3 | 3 | 2015-08-14 | 1 |
| 4 | 4 | 2015-08-15 | 4 |
| ... | ... | ... | ... |
| 2890 | 2890 | 2023-07-10 | 3 |
| 2891 | 2891 | 2023-07-11 | 5 |
| 2892 | 2892 | 2023-07-12 | 7 |
| 2893 | 2893 | 2023-07-12 | 9 |
| 2894 | 2894 | 2023-07-14 | 2 |

FIG. 6

700

```
print("seasonal? " + str(is_seasonal))
if is_seasonal:
    print('There is seasonality of order {}.'.format(mseas))
seasonal? True
There is seasonality of order 7.
```

FIG. 7

1000

| NATURE OF THE STORY | WEIGHT |
|---|---|
| USER | 10 |
| TECHNICAL DEBT | 9 |
| CONFIGURATION, ENHANCEMENT | 8 |
| ARCHITECTURE | 7 |
| UI/UX | 6 |
| TEST ONLY | 5 |
| SPIKE | 4 |
| SECURITY REMEDIATION | 3 |
| PIVOTAL TRACKER BUG | 2 |
| EMPTY, OTHER, OTHER | 1 |

FIG. 10

1100

```
tokenizer = AutoTokenizer.from_pretrained('nlptown/bert-base-multilingual-uncased-
sentiment')

model = AutoModelForSequenceClassification.from_pretrained('nlptown/bert-base-
multilingual-uncased-sentiment')
```

1105

```
def sentiment_score(title):
    tokens = tokenizer.encode(title, return_tensors='pt')
    result = model(tokens)
    return int(torch.argmax(result.logits))+1
```

1110

```
df['sentiment'] = df['title'].apply(lambda x: sentiment_score(x[:512]))
```

1115

```
df['sentiment'].mean().round(0).astype(int)
```

FIG. 11

1200

| | TIMESTAMP | NUMBER OF DEFECTS | QUARTER | MONTH | YEAR | DAY OF YEAR | DAY OF MONTH | WEEK OF YEAR |
|---|---|---|---|---|---|---|---|---|
| 0 | 2015-08-11 | 1 | 3 | 8 | 2015 | 223 | 11 | 33 |
| 1 | 2015-08-12 | 0 | 3 | 8 | 2015 | 224 | 12 | 33 |
| 2 | 2015-08-13 | 0 | 3 | 8 | 2015 | 225 | 13 | 33 |
| 3 | 2015-08-14 | 0 | 3 | 8 | 2015 | 226 | 14 | 33 |
| 4 | 2015-08-15 | 0 | 3 | 8 | 2015 | 227 | 15 | 33 |
| ... | ... | ... | ... | ... | ... | ... | ... | ... |
| 2890 | 2023-07-10 | 7 | 3 | 7 | 2023 | 191 | 10 | 28 |
| 2891 | 2023-07-11 | 12 | 3 | 7 | 2023 | 192 | 11 | 28 |
| 2892 | 2023-07-12 | 11 | 3 | 7 | 2023 | 193 | 12 | 28 |
| 2893 | 2023-07-13 | 12 | 3 | 7 | 2023 | 194 | 13 | 28 |
| 2894 | 2023-07-14 | 2 | 3 | 7 | 2023 | 195 | 14 | 28 |

1205

| | LAG1 | LAG2 | LAG3 | RDS | RDS SKEW | COMPLEXITY | WEIGHTED COMPLEXITY |
|---|---|---|---|---|---|---|---|
| 0 | NaN | NaN | NaN | 0.000000 | 0.014427 | 0.000000 | 0.000000 |
| 1 | NaN | NaN | NaN | 0.000000 | 0.014427 | 0.000000 | 0.000000 |
| 2 | NaN | NaN | NaN | 0.000000 | 0.014427 | 0.000000 | 0.000000 |
| 3 | NaN | NaN | NaN | 0.000000 | 0.014427 | 0.000000 | 0.000000 |
| 4 | NaN | NaN | NaN | 0.000000 | 0.014427 | 0.000000 | 0.000000 |
| ... | ... | ... | ... | ... | ... | ... | ... |
| 2890 | 4.0 | 12.0 | 21.0 | 0.001976 | 0.001976 | 34.966403 | 9.704968 |
| 2891 | 8.0 | 12.0 | 17.0 | 0.003388 | 0.003388 | 59.942405 | 16.637088 |
| 2892 | 6.0 | 10.0 | 14.0 | 0.003106 | 0.003106 | 54.947205 | 15.250664 |
| 2893 | 14.0 | 1.0 | 12.0 | 0.003388 | 0.003388 | 59.942405 | 16.637088 |
| 2894 | 13.0 | 14.0 | 11.0 | 0.000565 | 0.000565 | 9.990401 | 2.772848 |

FIG. 12A

1210

| | TITLE | SENTIMENT |
|---|---|---|
| 0 | UPLOAD COST RATES FOR ONBOARDED RESOURCES | 4 |
| 1 | ASSET HISTORY SHEET | 4 |
| 2 | DEPRECIATION OWNED DATA FIELD AVAILABLE | 1 |
| 3 | DISPOSAL/ASSET RETIREMENT TRIGGER | 4 |
| 4 | DISPOSAL/ASSET RETIREMENT TRIGGER | 4 |
| 5 | AUTOMATIC ALIGNED ASSET DISPOSAL/RETIREMENT FOR TAX ASSETS | 5 |
| 6 | CONTRACT MODIFICATION SALE FROM ONE LEGAL ENTITY TO ANOTHER | 1 |
| 7 | CUSTOM SALES TYPE LEASE ELEMENT CAPITALIZATION | 5 |
| 8 | CUSTOM SALES TYPE LEASE ELEMENT CAPITALIZATION | 5 |
| 9 | CUSTOM SET UP TYPE 1 | 5 |
| 10 | NEW DEPRECIATION KEY | 5 |
| 11 | MISCELLANEOUS ASSET DEVELOPMENT | 4 |
| 12 | SALES TYPE LEASE | 3 |
| 13 | SALES TYPE LEASE ADD THE NEW FILED IN ASSET GENERAL TAB | 5 |
| 14 | SERIAL NUMBER HOLD MULTIPLE VALUES | 4 |
| 15 | REPORT CHANGES TO ADD CUSTOMER ORDER NUMBER | 4 |
| 16 | CUSTOM SET UP TYPE 2 | 5 |
| 17 | INVENTORY CLEAN UP | 4 |

FIG. 12B

1300

```
from darts.metrics import mae, mase, ope

mae = mae(test, pred_nbeats_cov)
print(mae)

mase = mase(test, pred_nbeats_cov, train)
print(mase)

percent_error = ope(test, pred_nbeats_cov)
print(percent_error)
```

FIG. 13

CONTROLLING DEPLOYMENT OF SOFTWARE UTILIZING MACHINE LEARNING-BASED SOFTWARE DEFECT PREDICTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for controlling deployment of software utilizing machine learning-based software defect prediction.

In one embodiment, an apparatus comprises at least one processing device comprising a processor coupled to a memory. The at least one processing device is configured to generate a first data structure comprising a set of features characterizing software defects encountered for one or more pieces of software over a first period of time and software stories generated for the one or more pieces of software over the first period of time, the software stories comprising natural language descriptions of one or more portions of the one or more pieces of software developed over the first period of time. The at least one processing device is also configured to generate, utilizing at least one time series forecasting machine learning model that takes as input at least a portion of the first data structure, a second data structure characterizing predicted software defects for the one or more pieces of software over a second period of time. The at least one processing device is further configured to control deployment, during at least a portion of the second period of time, of at least one of the one or more pieces of software on one or more information technology assets of an information technology infrastructure based at least in part on at least a portion of the second data structure.

These and other illustrative embodiments include, without limitation, methods, apparatus, networks, systems and processor-readable storage media.

BRIEF DESCRIPTION OF THE DRAWINGS

FIG. 5 shows processing of software defect data in an illustrative embodiment.

FIG. 6 shows processing of software story data in an illustrative embodiment.

FIG. 7 shows pseudocode for determining seasonality of software defect data in an illustrative embodiment.

FIG. 10 shows weights assigned to different software story natures in an illustrative embodiment.

FIG. 11 shows pseudocode for generating software story language sentiment scores in an illustrative embodiment.

FIGS. 12A and 12B show tables of engineered features characterizing software defects and software stories for a sample data set in an illustrative embodiment.

FIG. 13 shows pseudocode for generating metrics characterizing time series forecasting machine learning model performance in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
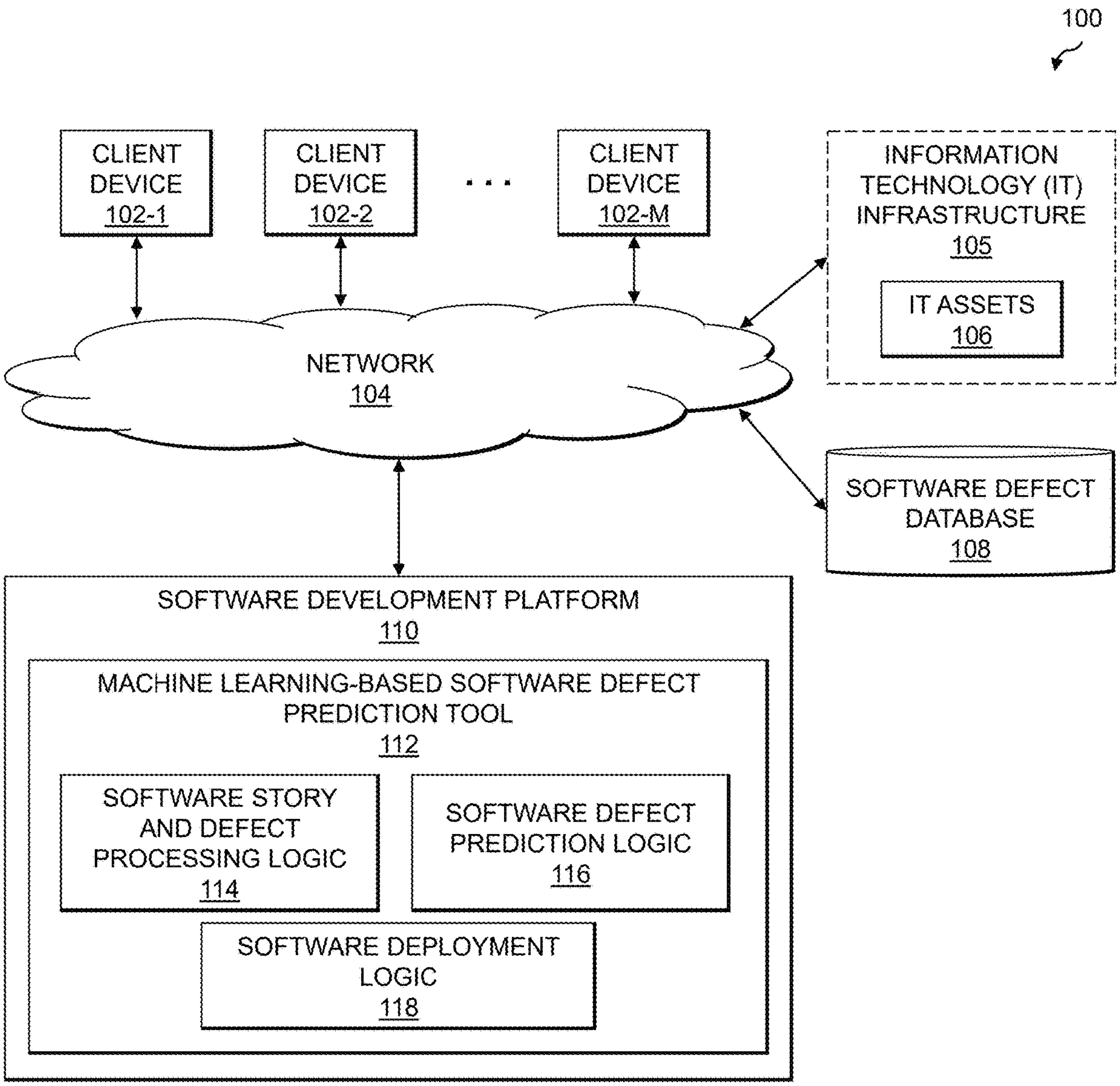
FIG. 1 is a block diagram of an information processing system configured for controlling deployment of software utilizing machine learning-based software defect prediction in an illustrative embodiment.

FIG. 1 shows an information processing system 100 configured in accordance with an illustrative embodiment. The information processing system 100 is assumed to be built on at least one processing platform and provides functionality for controlling deployment of software utilizing machine learning-based software defect prediction. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a software defect database 108, and a software development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the software development platform 110 is used for an enterprise system. For example, an enterprise may subscribe to or otherwise utilize the software development platform 110 for managing application or other software builds which are developed by users of that enterprise (e.g., software developers or other employees, customers or users which may be associated with different ones of the client devices 102 and/or IT assets 106 of the IT infrastructure 105). As used herein, the term “enterprise system” is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as “processing devices.” Some of these processing devices are also generally referred to herein as “computers.” The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more “enterprises.” Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The software defect database 108 is configured to store and record various information that is utilized by the software development platform 110. Such information may include, for example, information that is collected related to historical software defects, software development stories, machine learning models used for software defect prediction and forecasting, etc. The software defect database 108 may be implemented utilizing one or more storage systems. The term “storage system” as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software development platform 110, as well as to support communication between the software development platform 110 and other related systems and devices not explicitly shown.

The software development platform 110 may be provided as a cloud service that is accessible by one or more of the client devices 102 to allow users thereof to manage development and deployment of software products. The client devices 102 may be configured to access or otherwise utilize the software development platform 110 (e.g., to predict software defects associated with development of software code, for resource planning for software development and testing, etc.). In some embodiments, the client devices 102 are assumed to be associated with software developers, system administrators, IT managers or other authorized personnel responsible for managing application or other software development for an enterprise. In some embodiments, the IT assets 106 of the IT infrastructure 105 are owned or operated by the same enterprise that operates the software development platform 110. In other embodiments, the IT assets 106 of the IT infrastructure 105 may be owned or operated by one or more enterprises different than the enterprise which operates the software development platform 110 (e.g., a first enterprise provides support for multiple different customers, businesses, etc.). Various other examples are possible.

In some embodiments, the client devices 102 and/or the IT assets 106 of the IT infrastructure 105 may implement host agents that are configured for automated transmission of information with the software development platform 110 regarding development of one or more applications or other pieces of software. It should be noted that a “host agent” as this term is generally used herein may comprise an automated entity, such as a software entity running on a processing device. Accordingly, a host agent need not be a human entity.

The software development platform 110 in the FIG. 1 embodiment is assumed to be implemented using at least one processing device. Each such processing device generally comprises at least one processor and an associated memory, and implements one or more functional modules or logic for controlling certain features of the software development platform 110. In the FIG. 1 embodiment, the software development platform 110 implements a machine learning-based software defect prediction tool 112. The machine learning-based software defect prediction tool 112 comprises software story and defect processing logic 114, software defect prediction logic 116, and software deployment logic 118. The software story and defect processing logic 114 is configured to generate a set of features which characterize both software defects encountered for one or more pieces of software and software stories which are generated for the one or more pieces of software (e.g., for a first period of time). The software defect prediction logic 116 is configured to utilize the set of features as input to at least one time series forecasting machine learning model to generate software defect predictions for the one or more pieces of software (e.g., for a second period of time). The software deployment logic 118 is configured to control deployment of the one or more pieces of software (e.g., on the IT assets 106 of the IT infrastructure 105, for at least a portion of the second period of time) based at least in part on the generated software defect predictions.

At least portions of the machine learning-based software defect prediction tool 112, the software story and defect processing logic 114, the software defect prediction logic 116, and the software deployment logic 118 may be implemented at least in part in the form of software that is stored in memory and executed by a processor.

It is to be appreciated that the particular arrangement of the client devices 102, the IT infrastructure 105, the software defect database 108 and the software development platform 110 illustrated in the FIG. 1 embodiment is presented by way of example only, and alternative arrangements can be used in other embodiments. As discussed above, for example, the software development platform 110 (or portions of components thereof, such as one or more of the machine learning-based software defect prediction tool 112, the software story and defect processing logic 114, the software defect prediction logic 116, and the software deployment logic 118) may in some embodiments be implemented internal to the IT infrastructure 105.

The software development platform 110 and other portions of the information processing system 100, as will be described in further detail below, may be part of cloud infrastructure.

The software development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the software defect database 108 and the software development platform 110 or components thereof (e.g., the machine learning-based software defect prediction tool 112, the software story and defect processing logic 114, the software defect prediction logic 116, and the software deployment logic 118) may be implemented on respective distinct processing platforms, although numerous other arrangements are possible. For example, in some embodiments at least portions of the software development platform 110 and one or more of the client devices 102, the IT infrastructure 105, the IT assets 106 and/or the software defect database 108 are implemented on the same processing platform. A given client device (e.g., 102-1) can therefore be implemented at least in part within at least one processing platform that implements at least a portion of the software development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the software defect database 108 and the software development platform 110, or portions or components thereof, to reside in different data centers. Numerous other distributed implementations are possible. The software development platform 110 can also be implemented in a distributed manner across multiple data centers.

Additional examples of processing platforms utilized to implement the software development platform 110 and other components of the information processing system 100 in illustrative embodiments will be described in more detail below in conjunction with FIGS. 17 and 18.

It is to be understood that the particular set of elements shown in FIG. 1 for controlling deployment of software utilizing machine learning-based software defect prediction is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for controlling deployment of software utilizing machine learning-based software defect prediction will now be described in more detail with reference to the flow diagram of FIG. 2. It is to be understood that this particular process is only an example, and that additional or alternative processes for controlling deployment of software utilizing machine learning-based software defect prediction may be used in other embodiments.

In this embodiment, the process includes steps 200 through 204. These steps are assumed to be performed by the software development platform 110 utilizing the machine learning-based software defect prediction tool 112, the software story and defect processing logic 114, the software defect prediction logic 116, and the software deployment logic 118. The process begins with step 200, generating a first data structure comprising a set of features characterizing software defects encountered for one or more pieces of software over a first period of time (e.g., a designated time frame) and software stories generated for the one or more pieces of software over the first period of time. The software stories comprise natural language descriptions of one or more portions (e.g., features, functionality) of the one or more pieces of software developed over the first period of time.

The set of features may comprise, for a given one of the one or more pieces of software, a ratio of (i) a number of software defects encountered on the given piece of software during a first time frame to (ii) a number of software stories having one or more designated status values during a second time frame, the second time frame being longer than the first time frame. The one or more designated status values may comprise closed, deployed and waiting to deploy.

The set of features may also or alternatively comprise, for a given one of the one or more pieces of software, a ratio of (i) a number of software defects encountered on the given piece of software during a first time frame and a complexity of software stories having one or more designated status values during a second time frame to (ii) a number of the software stories having the one or more designated status values during the second time frame, the second time frame being longer than the first time frame. The one or more designated status values may comprise closed, deployed and waiting to deploy. The complexity of a given one of the software stories having the one or more designated status values may be based at least in part on a number of story points in the given software story.

The set of features may further or alternatively comprise, for a given one of the one or more pieces of software, an average of a weighted sum of complexities of software stories, associated with different categories, having one or more designated status values during a given time frame. The different categories may correspond to different natures of the software stories. The different categories may comprise at least two of user, technical debt, configuration, enhancement, architecture, user interface, user experience, testing only, brainstorming, security remediation, and bug tracking.

The set of features may further or alternatively comprise, for a given one of the one or more pieces of software, information characterizing sentiment of one or more of the software stories associated with the given piece of software and having one or more designated status values during a given time frame, the information characterizing sentiment being determined utilizing a generative artificial intelligence powered natural language processing machine learning model. The generative artificial intelligence powered natural language processing machine learning model may comprise a Bidirectional Encoder Representations from Transformers (BERT) machine learning model.

The process continues with step 202, generating, utilizing at least one time series forecasting machine learning model that takes as input at least a portion of the first data structure, a second data structure. The second data structure characterizes predicted software defects for the one or more pieces of software over a second period of time. The at least one time series forecasting machine learning model may comprise a multilayer perceptron machine learning model for univariate time series forecasting. In some embodiments, the at least one time series forecasting machine learning model comprises a Neural Basis Expansion Analysis for Interpretable Time Series Forecasting (N-BEATS) machine learning model.

The process continues with step 204, controlling deployment of at least one of the one or more pieces of software, during at least a portion of the second period of time, on one or more IT assets of an IT infrastructure based at least in part on at least a portion of the second data structure. Step 204 may include adjusting one or more resources allocated for software development of the at least one of the one or more pieces of software prior to the deployment of the at least one of the one or more pieces of software on the one or more IT assets of the IT infrastructure during the at least a portion of the second period of time. Step 204 may also or alternatively include generating a testing plan for testing of the at least one of the one or more pieces of software prior to the deployment of the at least one of the one or more pieces of software on the one or more IT assets of the IT infrastructure during the at least a portion of the second period of time.

Figure 2:
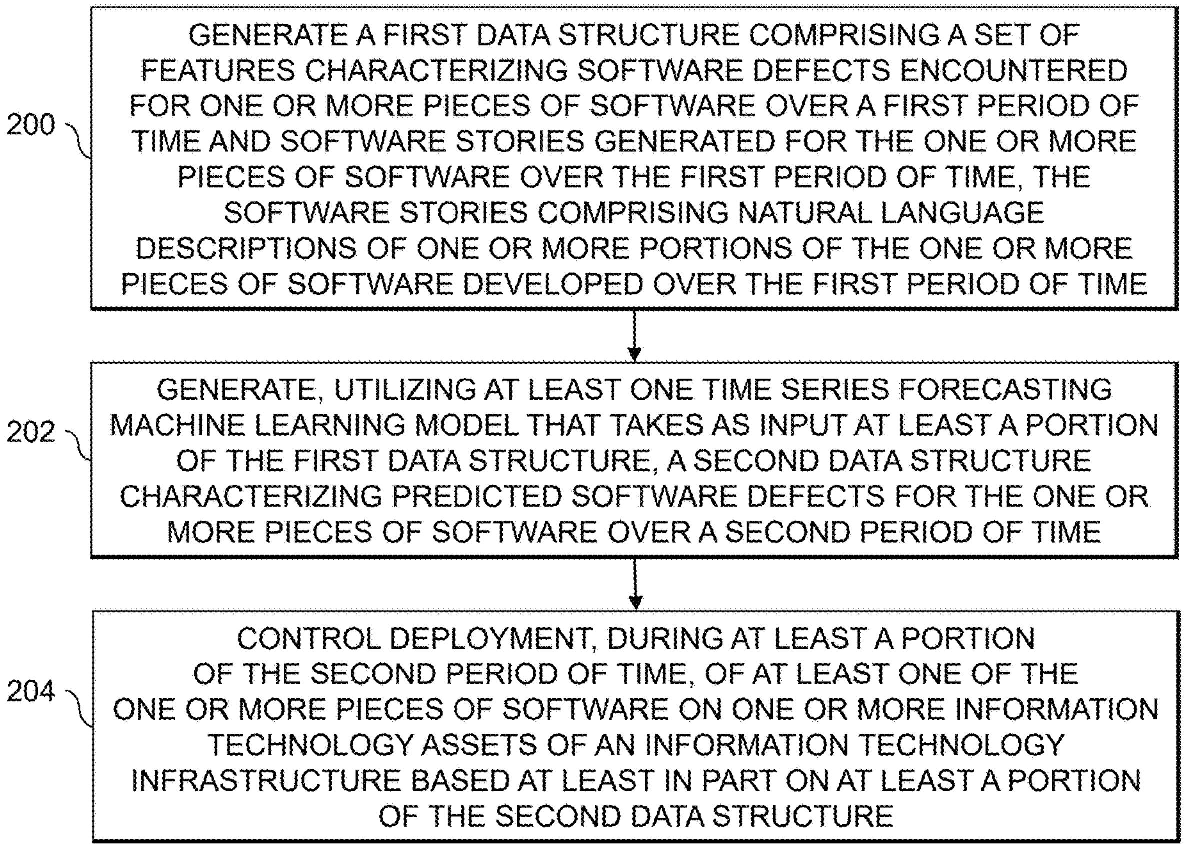
FIG. 2 is a flow diagram of an exemplary process for controlling deployment of software utilizing machine learning-based software defect prediction in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In order to maintain software quality (e.g., for customer satisfaction) and to save testing expenses, there is a desire for defect-free software. Software defect prediction (SDP) helps enterprises, organizations or other entities foresee problems to maintain software quality for customer satisfaction and to save testing costs. SDP is part of the software development life cycle, in which faults or defects are predicted using a machine learning (ML) approach with historical data. This enables software product teams to drive more visibility on precautionary measures for resource planning, improving code quality, and effective test planning for upcoming releases.

Illustrative embodiments provide technical solutions for utilizing machine learning (ML) techniques, such as generative artificial intelligence (AI) language models on a data set of historical user stories developed for applications and the defects reported against the same during a testing phase, to forecast defects in applications using time series forecasting. As used herein, user stories (also referred to simply as stories) are user-generated informal and natural language descriptions regarding features and functionality of at least a portion of an application or other piece of software. The technical solutions are advantageously able to optimize ML model performance (e.g., in terms of precision), through the use of unique features generated from the historical data sets to train the most accurate time series forecasting ML models for predicting the number of defects in software. Such features may include, for example, features based on the number of stories that were developed, their complexity, their weightages, their language sentiment scores (e.g., determined utilizing generative AI), and the number of defects reported. The technical solutions are further able to improve the accuracy of time series forecasting ML models through application of transfer learning and hyperparameter tuning to the unique features devised to optimize the time series forecasting ML models.

The performance of time series forecasting ML models is evaluated through one or more metrics, such as precision, accuracy, overall percentage error, and confusion metrics. The results indicate that the various models and their optimized forms achieve promising results. In some embodiments, a deep learning neural network architecture is utilized, such as a multilayer perceptron (MLP) model for univariate time series forecasting. For example, a Neural Basis Expansion Analysis for Interpretable Time Series Forecasting (N-BEATS) model may have an accuracy of 96%, though various other models may be utilized with accuracy around 80-85%, such as a gradient tree boosting algorithm (e.g., XGBoostRegressor), Facebook Prophet, an ensemble approach of multiple models (e.g., autoregressive integrated moving average (ARISMA), AutoARIMA, Facebook Prophet, Theta and a Neural Hierarchical Interpolation for Time Series Forecasting (N-HITS) model, etc.), etc. In this way, improved accuracy may be achieved compared to conventional time series forecasting models, through introducing unique features related to stories and defects for model training and improved prediction trends.

To develop an effective ensemble of features for training a ML model for time series forecasting, some embodiments leverage generative AI techniques to optimize the accuracy in predicting the number of defects that can come up in the future based on historical defects and user story digital footprints of entire applications. This enables the product teams to drive more visibility on precautionary measures for resource planning. Further, this enables improvements in code quality and effective test planning for upcoming releases.

SDP is a technique for improving software quality and reducing software testing costs. In some embodiments, SDP is implemented through the creation of multiple categorization or classification models utilizing various ML approaches. Various enterprises, organizations or other entities that develop various types of software seek to foresee problems to maintain software quality (e.g., for customer satisfaction, for saving testing costs, etc.). SDP is part of the software development life cycle in which faults or defects are predicted. In some embodiments, SDP is performed using one or more ML models and historical data related to defects. A goal of SDP is to provide high-quality software and dependability while making efficient use of limited resources. As a result of this, software developers will be able to prioritize the utilization of computer resources at each level of the software development process. A wide range of ML approaches are investigated to anticipate bugs, errors, faults or other defects in software.

The technical solutions in some embodiments are able to generate novel software metrics for predicting bugs, errors, faults or other defects in software. The data set used may be subject to feature engineering for generating novel metrics, including metrics which are based on the number of stories developed, their complexity, their weightages, their language sentiment scores powered by generative AI, and the number of defects reported against the same during testing phases. After data set pre-processing, feature engineering is applied to devise novel metrics. A feature ensemble approach is then used to train one or more ML models and integrate the results. The trained ML models are analyzed and compared to evaluate their performance using various metrics, such as one or more of precision, accuracy, overall percentage error, and confusion matrix.

Figure 3:
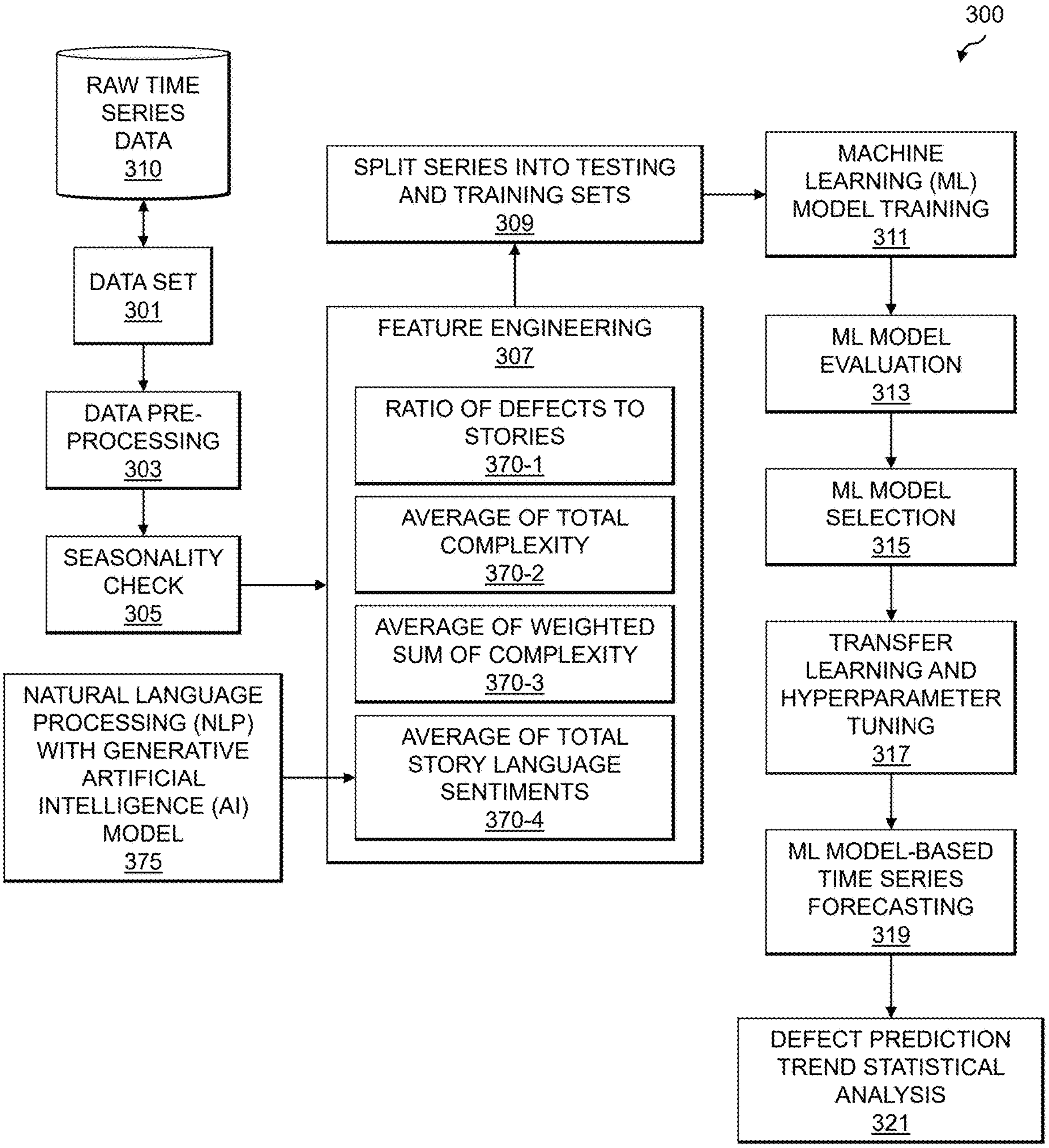
FIG. 3 shows a system for machine learning-based software defect prediction in an illustrative embodiment.

FIG. 3 shows a system architecture 300 for SDP. The system architecture 300 includes a data set 301 (e.g., which may be obtained from raw time series data 310), which is subject to data pre-processing in block 303. A seasonality check is performed in block 305, followed by feature engineering in block 307. The feature engineering in block 307 generates various novel features, including a ratio of defects to stories 370-1 (e.g., per quarter or other designated time period), an average of total complexity 370-2 (e.g., per quarter or other designated time period), an average of weight sum of complexity 370-3 (e.g., per quarter or other designated time period), and an average of total storage language sentiments 370-4 (e.g., per quarter or other designated time period). The average of total story language sentiments 370-4 may be generated based on natural language processing (NLP) with a generative AI model 375. The features 370-1 through 370-4 produced during feature engineering in block 307 are then split into testing and training sets in block 309, followed by ML model training in block 311. The ML model training in block 311 may train a number of different ML models, such as Facebook Prophet, ARIMA, Theta, N-BEATS and ensemble time series forecasting models. The various trained ML models are then evaluated in block 313 (e.g., utilizing Most Probable Explanation (MPE) or other suitable evaluation metrics). A ML model is then selected in block 315, based on the ML model evaluation in block 313. Transfer learning and hyperparameter tuning are then performed for the selected ML model in block 317. The trained and tuned ML model is then used for time series forecasting (e.g., SDP) in block 319, which is used to produce defect prediction trend statistical analysis output in block 321.

Figure 4:
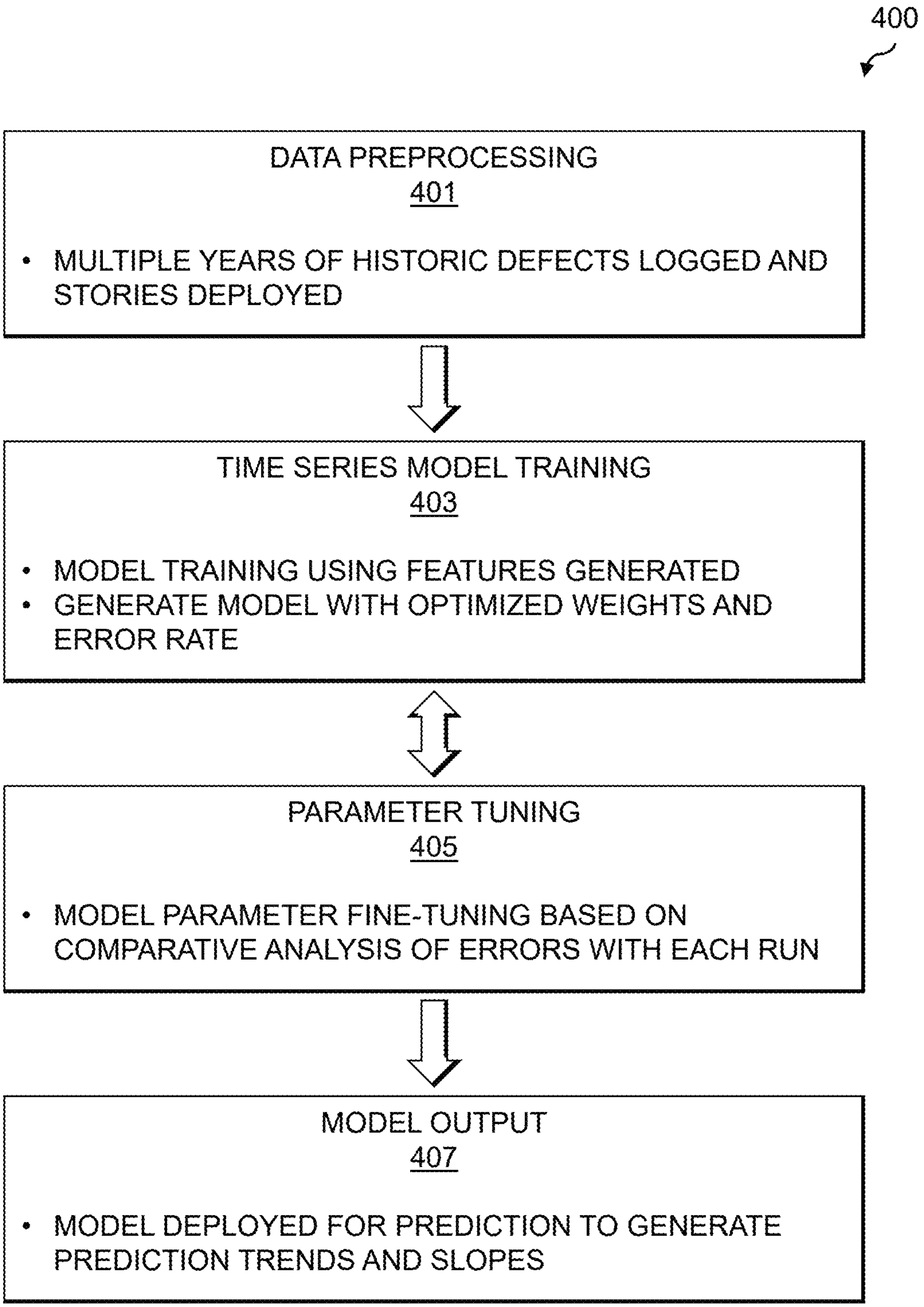
FIG. 4 shows a system flow for machine learning-based software defect prediction in an illustrative embodiment.

FIG. 4 shows a system flow 400 (e.g., which may be performed using the system architecture 300 of FIG. 3). The system flow 400 includes data preprocessing 401, time series model training 403, parameter tuning 405 and model output 407. The data preprocessing 401 includes preprocessing historical data, such as multiple years (e.g., 8 years in the experimental data set described herein) of historic software defects that were logged and associated stories that were deployed. Time series model training 403 includes model training using novel features and generating a model with optimized weights and error rate (e.g., training and generation of an N-BEATS model). Parameter tuning 405 includes model parameter fine-tuning based on comparative analysis of errors with each run. Time series model training 403 and parameter tuning 405 may be performed in an iterative process with multiple iterations of the time series model training 403 and the parameter tuning 405. Model output 407 includes deploying the trained and tuned ML model to generate prediction trends and slopes for SDP.

In some embodiments, the experimental data set used includes 8 years of historic logged defects and stories deployed against all the applications of Enterprise Finance Systems (EFS) of an enterprise, which is available on an on-premises instance of Software Development and IT Operations (DevOps) where development and testing teams organize the digital footprint. This data set includes around 100,000 data points from 50 applications and 15 properties. From data preprocessing 401, data set analysis is performed to conclude that that the data set needs to be transformed to a standard format before applying an ML model. In some embodiments, a pandas library is used to perform the data preprocessing 401. First, a defects data set is processed. In each column (e.g., defect identifier (ID), state, created data, etc.) of the defects data set, there is a wide range of values. The defects data set is processed to get the number of defects recorded on each day. All dates are standardized into a YYYY-MM-DD format and a uniform time zone. The data preprocessing 401 includes removing defects with certain states (e.g., canceled, rejected, etc.). FIG. 5 illustrates preprocessing of a defects data set, where a table 500 of defects information (including columns for ID, work item, title, state, application, type, and created time) is converted into a data structure 505 characterizing the number of defects for each timestamp (e.g., each day).

The data preprocessing 401 further includes processing of a stories data set. In each column of the stories data set, there is a wide range of values (e.g., story ID, state, closed date, deployed date, size, requirement type, etc.). The specific date to which a completed story belongs may be determined according to the following precedence: story closure date>story deployment date. Stories where both are not present are omitted, as the intention is to train ML models against stories which were completed, deployed or waiting to deploy as those affirm testing completion. The data is processed to get the number of stories completed/deployed on each day to get the processed results. All dates are standardized into the YYYY-MM-DD format and a specific time zone. The data preprocessing 401 also includes setting the size to 1 if empty, and the requirement type to "empty" if empty. FIG. 6 illustrates preprocessing of a stories data set, where a table 600 of stories information (including columns for ID, work item, title, application, closed date, deployed date, requirement type and size) is converted into a data structure 605 characterizing the number of stories for each timestamp (e.g., each day).

Figure 8:
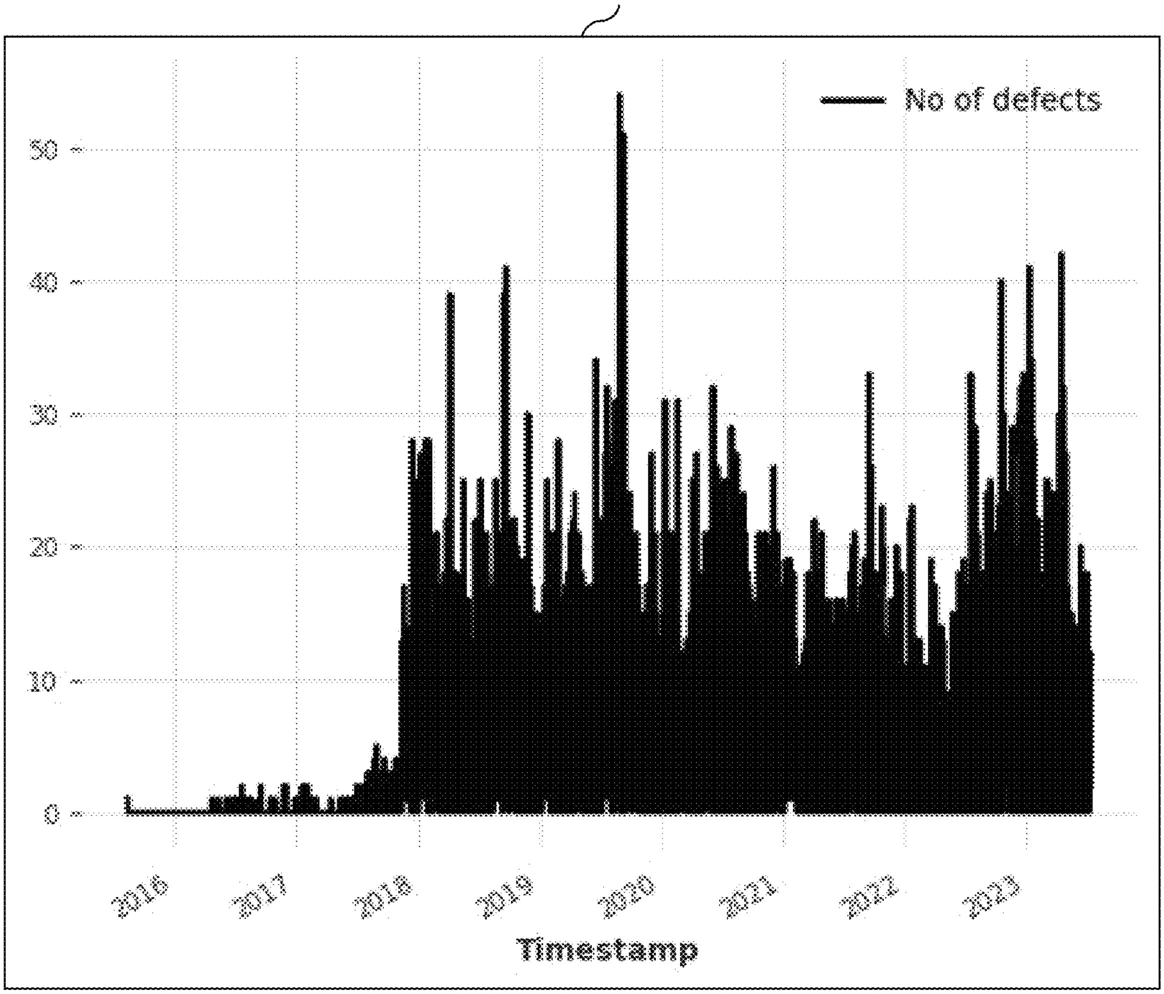
FIG. 8 shows a plot of software defects encountered over a period of time in an illustrative embodiment.

Following the data preprocessing 401, data visualization and a seasonality check (e.g., block 305 in system architecture 300) is performed. The data visualization includes a graph with a line plot of the preprocessed and actual data that was produced. Seasonality in time series analysis refers to a recurring pattern or regular fluctuation in the data the occurs at fixed intervals of time. The example data set has a seasonality order of 7, which is evaluated using the pseudocode 700 of FIG. 7. This means that there are regular fluctuations and interrelationship between the defects observed weekly. FIG. 8 shows the graph 800 of the number of defects observed over time for the experimental data set.

The ML classification with the experimental data set were performed using a server with a graphics processing unit (GPU) utilizing various libraries and tools such as Conda, PyTorch, TensorFlow, and the NVIDIA CUDA Toolkit. The ML model was implemented using the Python programming language in this experiment. Python may be used in predictive analytics and data science projects involving both qualitative and quantitative data. The Python packages pandas, numpy, datetime, collections, chain, skew, seaborn, darts, matplotlib, transformers, torch and plotly may be used to build a ML predictor. It should be appreciated, however, that various other programming languages and software packages may be used to build and deploy ML models.

Figure 9A:
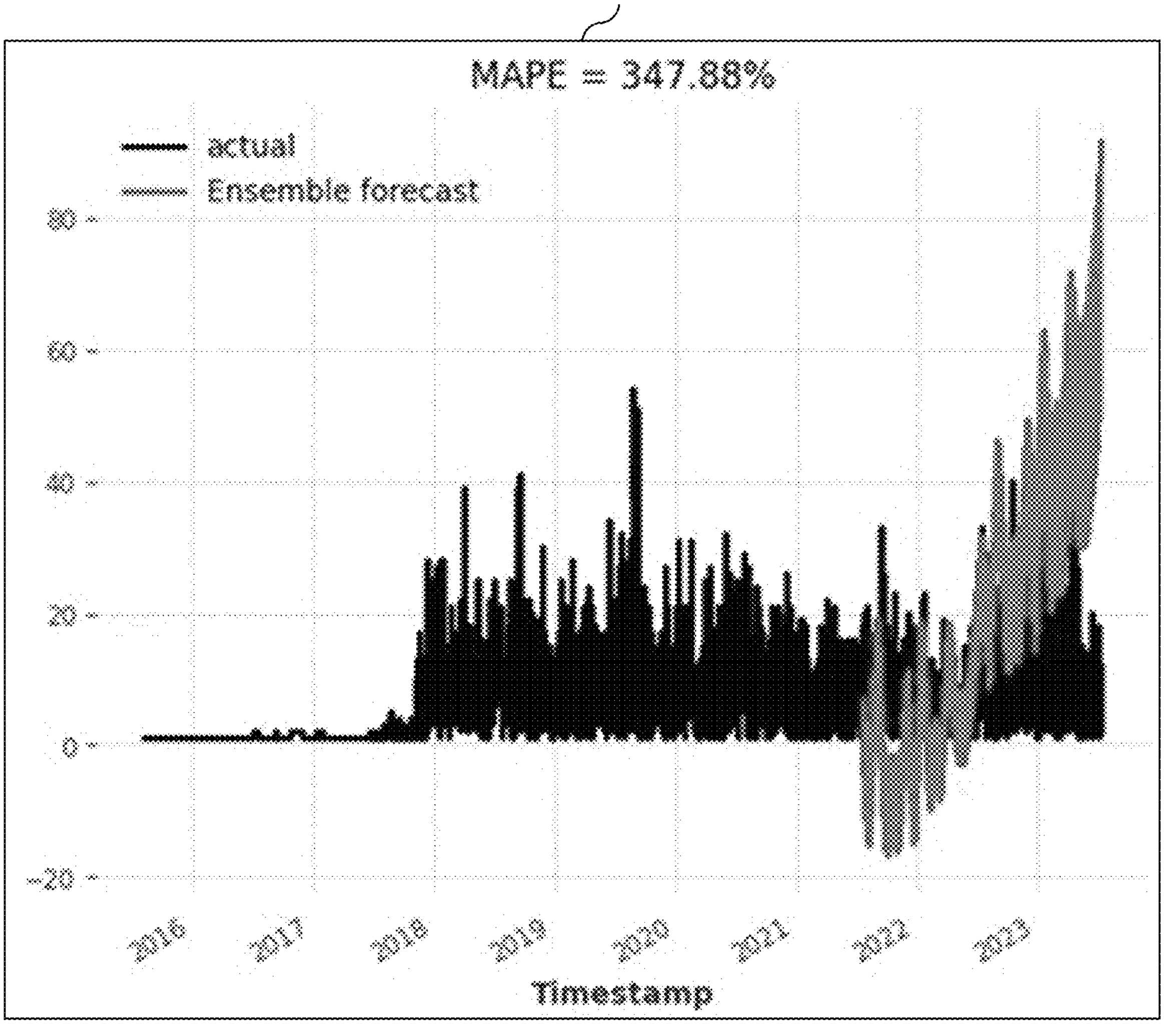
FIGS. 9A-9D show plots comparing actual encountered software defects and machine learning-based predictions of software defects in an illustrative embodiment.
Figure 9B:
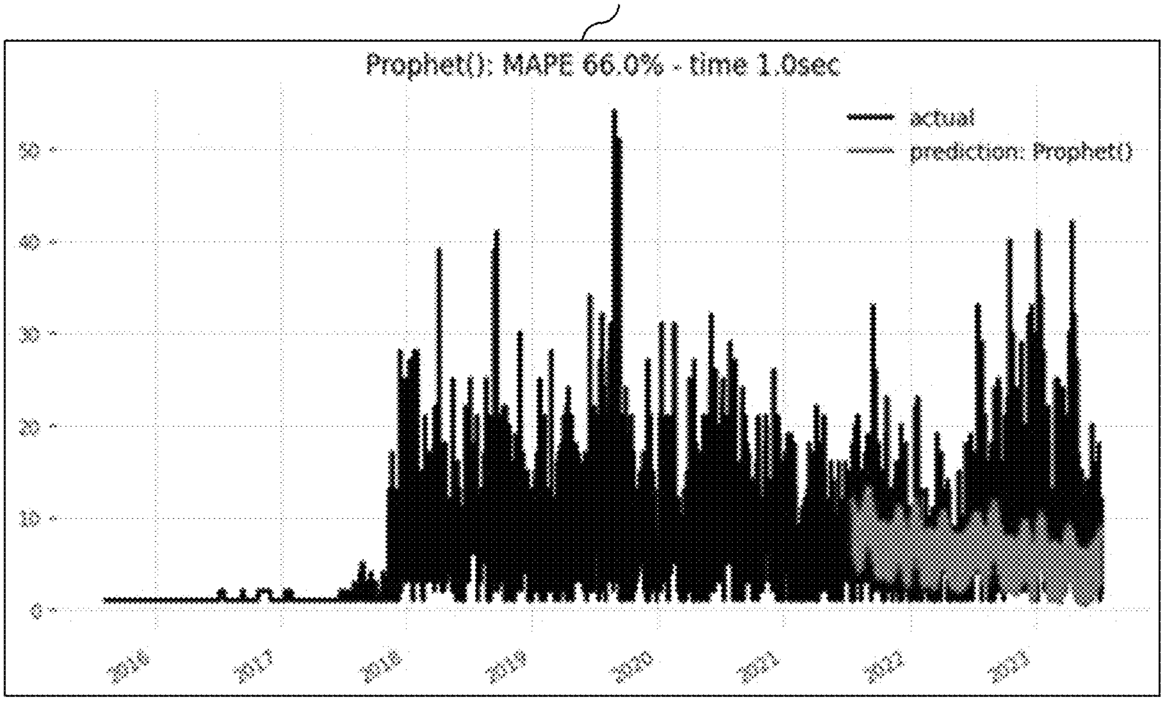
Figure 9C:
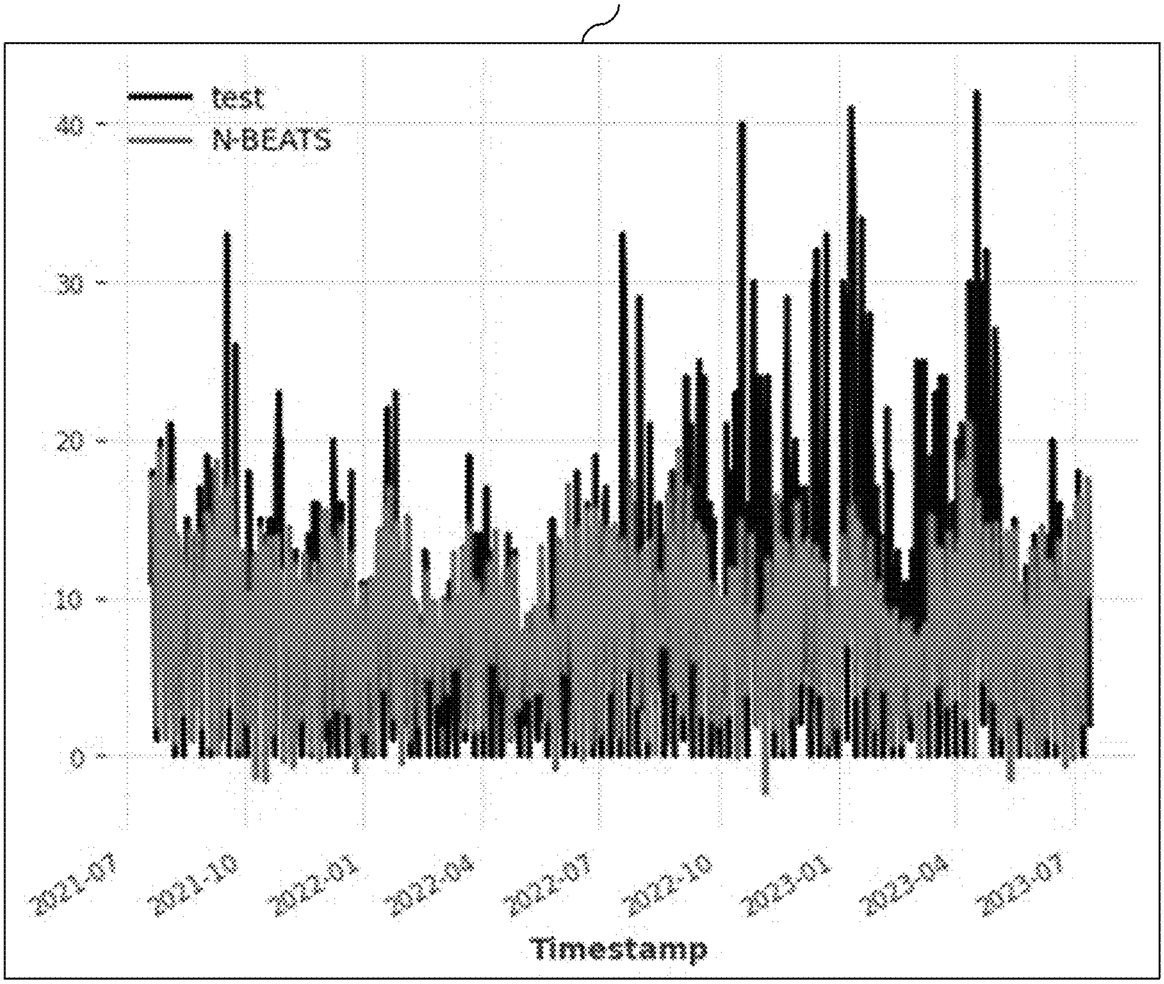
Figure 9D:
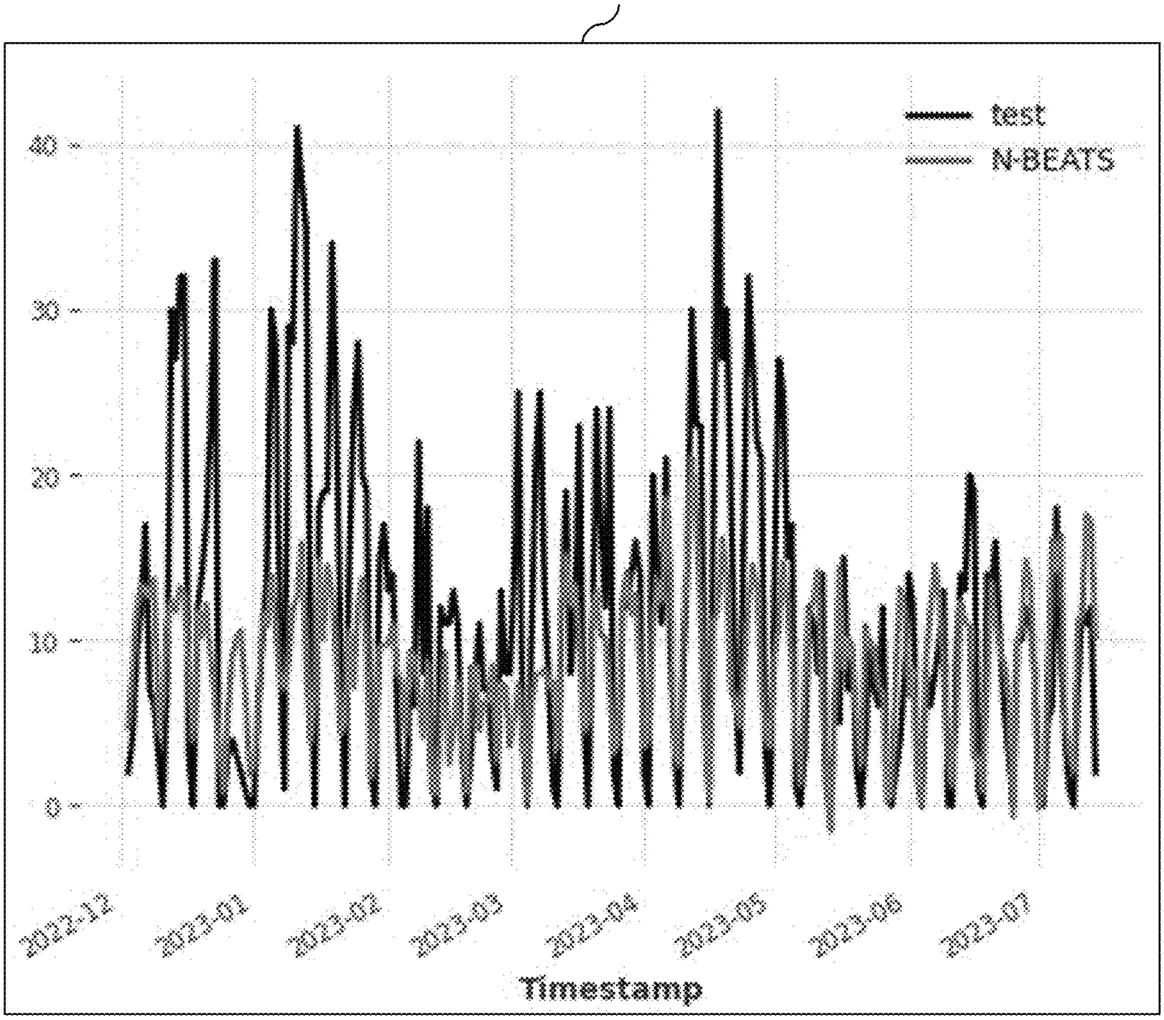

Cross validation of ML models (e.g., Facebook Prophet, Ensemble forecast, ARIMA, Theta, N-BEATS, etc.) that were trained on the same data set is performed, and the predictions were made with such ML models. The trained Facebook Prophet, Ensemble forecast, ARIMA and Theta models gave results that were not always close to the actual values—the accuracy of these models for the experimental data set were around 80-85%. The N-BEATS model exhibited improved accuracy (e.g., around 96% using the experimental data set). A goal and objective of analyzing various ML models is to improve the accuracy of classifiers so that outcomes can be predicted as precisely as feasible. The expected model analysis is compared and distinguished to recognized benchmark metrics (e.g., Mean Absolute Percentage Error (MAPE)) to ensure and confirm that the models are adaptive. Error measures such as Mean Absolute Error (MAE), Root Mean Squared Error (RMSE), MAPE, etc., show how many errors there were while training and testing the ML models. The smaller the error values, the lesser the error in the ML models. The higher the error values, the more the error in the ML models. With the experimental data set, the N-BEATS model has lower error values in both scenarios (e.g., without optimization from other techniques, such as parameter tuning 405). Various metrics show the performance error values of the ML models. In terms of performance error evaluation, ML models such as Facebook Prophet, Ensemble forecast, ARIMA and Theta have a higher error rate than N-BEATS. This is illustrated in FIGS. 9A and 9B, which show plots 900 and 905, respectively, showing the error rates for the Ensemble forecast and Facebook Prophet ML models. FIGS. 9C and 9D shows plots 910 and 915, showing the results of cross-validation for the N-BEATS ML model, where the metric to determine the error rate was the overall percentage error and the error rate was 8.2%. The trends identified using the N-BEATS ML model performed well except for some spokes (e.g., outliers) that were observed.

Feature engineering in block 307 will now be described in further detail, where unique features are developed based on the number of stories developed, their complexity, their weightages, their language sentiments scores powered by generative AI, and the number of defects reported, to optimize a selected ML model (e.g., the N-BEATS ML model in some embodiments). The novel features include the ratio of defects to stories 370-1 (also referred to as RDS), the average of total complexity 370-2, the average of weighted sum of complexity 370-3, and the average of total story language sentiments 370-4.

Stories are an important aspect for any defects appearing in an application or other piece of software. Thus, the ratio of defects to stories 370-1 or RDS feature is introduced into the modeling to represent how stories and defects influence each other in each designated time period (e.g., in each quarter). The formulation for the RDS feature is:

$$\left(\frac{n_d}{n_s}\right)_{(quarter)}$$

where $n_d$ is the number of defects on a given day, and $n_s$ is the number of stories that are closed, deployed or waiting to deploy in a given quarter. This metric takes the defects recorded on a given day and divides it with the number of stories with a status as mentioned above. This ratio essentially explains how the defects of a given day are contributing to the total stories written in a given quarter. This will quantify the defects to stories, making the ML models better understand the relation between stories and defects. It should be noted that, in some embodiments, the RDS metric is calculated using a skewing technique to deal with the values that were zero (e.g., which can occur due to insufficient data and division by zero for zero stories in a quarter).

To include the complexity of a story into the ML models, the average of total complexity 370-2 feature uses the number of story points to calculate the average complexity of a quarter and multiplies that by the number of defects observed on each day with the complexity of that quarter, respectively. The formulation for the average of total complexity 370-2 feature is:

$$\left(\frac{nsp * n_d}{n_s}\right)_{(quarter)}$$

where $n_d$ is the number of defects on a given day, $n_s$ is the number of stories that are closed, deployed or waiting to deploy in a given quarter, and nsp is the number of story points per quarter. This metric explains how the average complexity of a quarter's stories affects the number of defects that are coming per day in the quarter.

The average of weighted sum of complexity 370-3 feature considers the weightage of the nature of a story, and calculates how these various weightages, when associated with the number of story points, can affect the defects on a day per quarter. The formulation for the average of weighted sum of complexity 370-3 feature is:

$$\frac{\sum(\text{Weightage of nature})(\text{Number of story points of that nature})}{\sum(\text{Number of story points})}$$

FIG. 10 shows a table 1000 with weights assigned to different natures of stories, including user, technical debt, configuration/enhancement, architecture, user interface (UI)/user experience (UX), test only, spike, security remediation, pivotal tracker bug, and empty/other.

Story language and its sentiments are also probable aspects for any defects appearing in an application or other piece of software. Thus, the average of total story language sentiments 370-4 feature is used to represent how the sentiments of the story language influences defects. The formation for the average of total story language sentiments 370-4 is:

$$\frac{\sum(\text{Sentiment scores of stories in the quarter})}{n_s}$$

where $n_s$ is the number of stories that are closed, deployed or waiting to deploy in a given quarter. In some embodiments, the stories language summary sentiments analysis is performed using a generative AI powered ML model such as a Bidirectional Encoder Representations from Transformers (BERT) model, which is pretrained on over 150,000 parameters with 67% accuracy. It returns the sentiment for sentences as a number scoring (e.g., from 1 to 5, with 1 being the worst sentiment and 5 being the best sentiment), which are close to human sentiments. FIG. 11 shows pseudocode 1100, 1105, 1110 and 1115 for determining the story language sentiments using the BERT model. FIG. 12A shows resultant data frames ready for training the ML models after deriving all the features 370-1 through 370-4 from historical data, including tables 1200 and 1205 (with columns for timestamp, number of defects, quarter, month, year, day of year, day of month, and week of year for each day, along with metrics LAG1, LAG2, LAG3, RDS and RDS skew (the ratio of defects to stories 370-1), complexity (the average of total complexity 370-2) and weighted complexity (the average of weighted sum of complexity 370-3). FIG. 12B shows the resultant data frame including table 1210 with columns for the stories and associated title and sentiment (the average of total story language sentiments 370-4).

Figure 14:
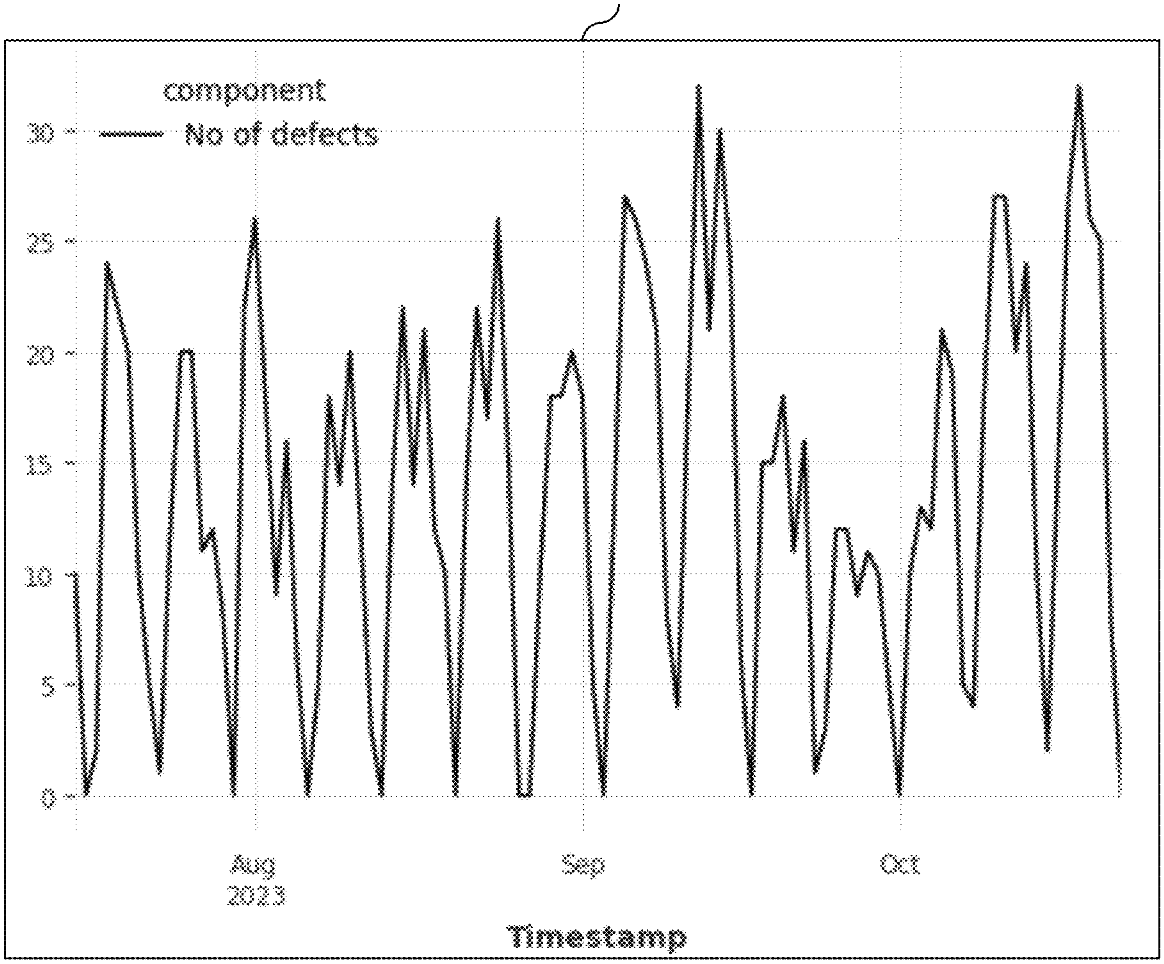
FIG. 14 shows a time series plot of software defect predictions in an illustrative embodiment.
Figure 15:
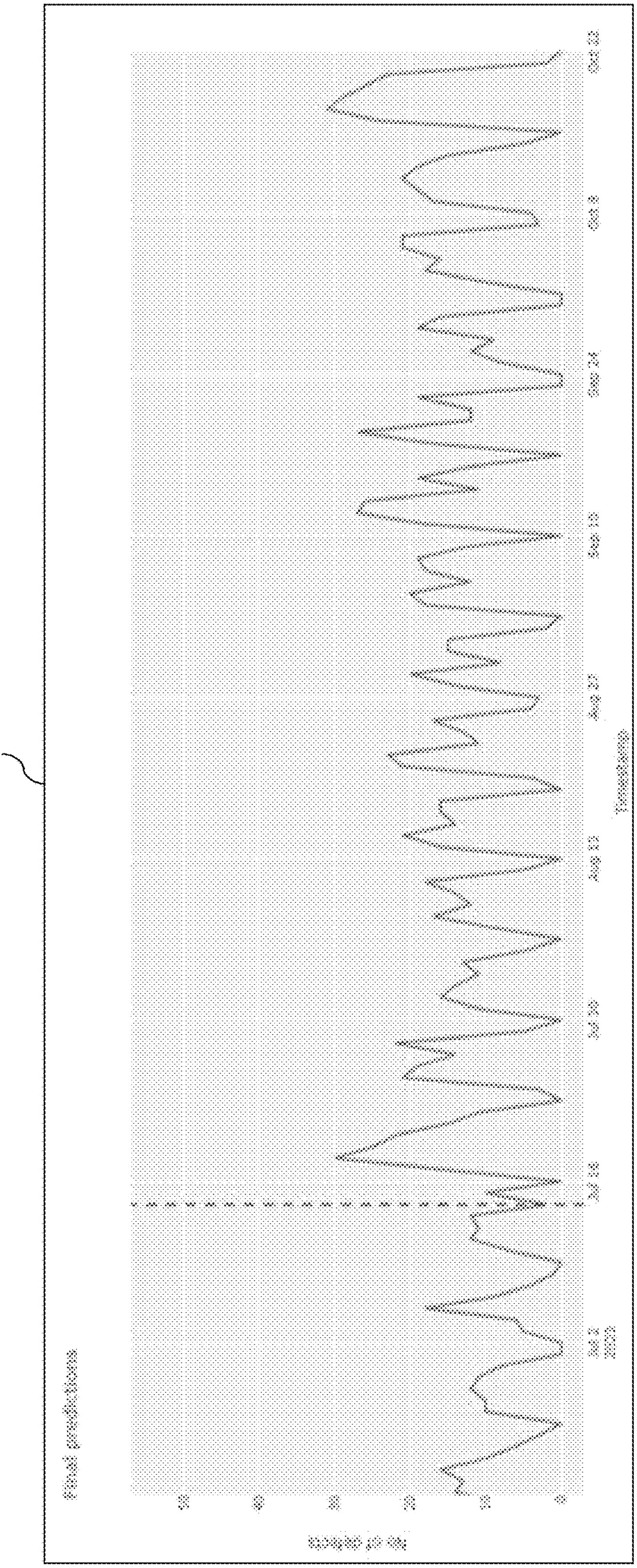
FIG. 15 shows a time series plot of actual encountered software defects for a first time period and software defect predictions for a second time period in an illustrative embodiment.

Utilizing the features 370-1 through 370-4 generated via feature engineering in block 307, training of the ML models in block 311 is significantly improved. For example, introduction of the features 370-1 through 370-4 into the N-BEATS ML model provides significantly improved performance and SDP trend forecasts. The trained N-BEATS ML model had a significant change in the MAE and Overall Percentage Error (OPE). For example, the OPE is reduced to around 4% from around 8%. FIG. 13 shows pseudocode 1300 for generating metrics for ML model evaluation in block 313, including MAE, MASE and OPE metrics with values of 4.765388598659161, 1.2015911293388775 and 3.1848603635478305, respectively, using the experimental data set. In block 317, transfer learning is used to save the ML models that gave the best results after hyperparameter tuning. FIG. 14 shows a plot 1400 of SDP for the next 100 days using the ML model selected in block 315 (e.g., the trained N-BEATS ML model) following transfer learning and hyperparameter tuning in block 317. FIG. 15 shows a plot 1500 showing the actual historical data plot based on historical defects (e.g., to the left of the vertical dotted line, prior to July $16^{th}$) along with the defect predictions (e.g., to the right of the vertical dotted line, starting July $16^{th}$ and continuing through October $22^{nd}$). The plots 1400 and 1500 are examples of the ML model-based time series forecasting in block 319. As can be seen from the plots 1400 and 1500, after the introduction of the features 370-1 through 370-4, the ML model is learnt and trained well providing performance which did not deteriorate.

Figure 16:
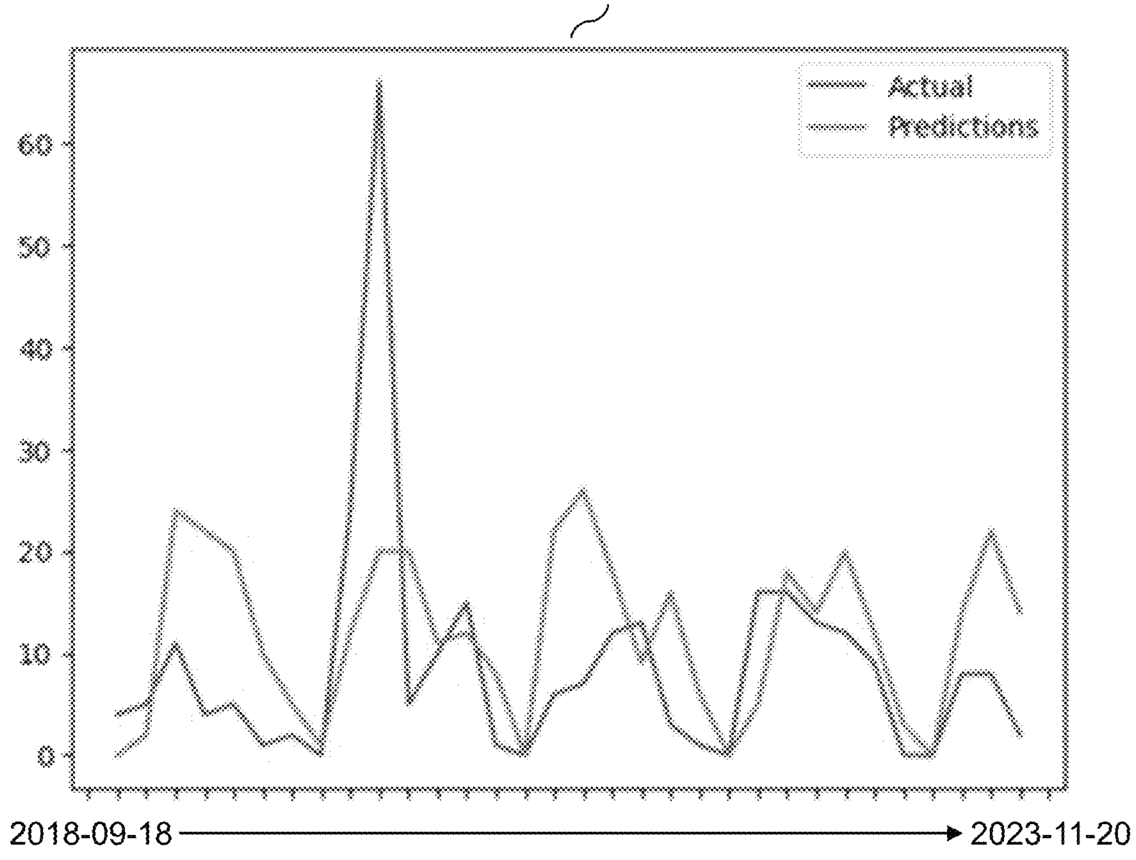
FIG. 16 shows a plot comparing actual and predicted software defects in an illustrative embodiment.

The defect prediction trend statistical analysis of block 321 will now be described in further detail. Statistical analysis is the process of using quantitative tools to look for patterns, trends and relationships in prediction data and actual data from the same timeline. FIG. 16 shows a plot 1600 showing the actual and predicted numbers of defects between Sep. 18, 2023 and Nov. 20, 2023. As illustrated in the plot 1600, the prediction trend and slopes are close to one another.

The technical solutions described herein provide a number of technical advantages through the unique use of historical development and testing digital footprint data for optimizing SDP using ML and generative AI techniques. Various unique features are developed and generated based on the number of stories developed, their complexity, their weightages, their language sentiment scores powered by generative AI models, and the number of defects reported. Further, the technical solutions utilize transfer learning and hyperparameter tuning for the unique selected features (e.g., features 370-1 through 370-4) that are devised to optimize or improve performance of the ML models.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling deployment of software utilizing machine learning-based software defect prediction will now be described in greater detail with reference to FIGS. 17 and 18. Although described in the context of system 100, these platforms may also be used to implement at least portions of other information processing systems in other embodiments.

Figure 17:
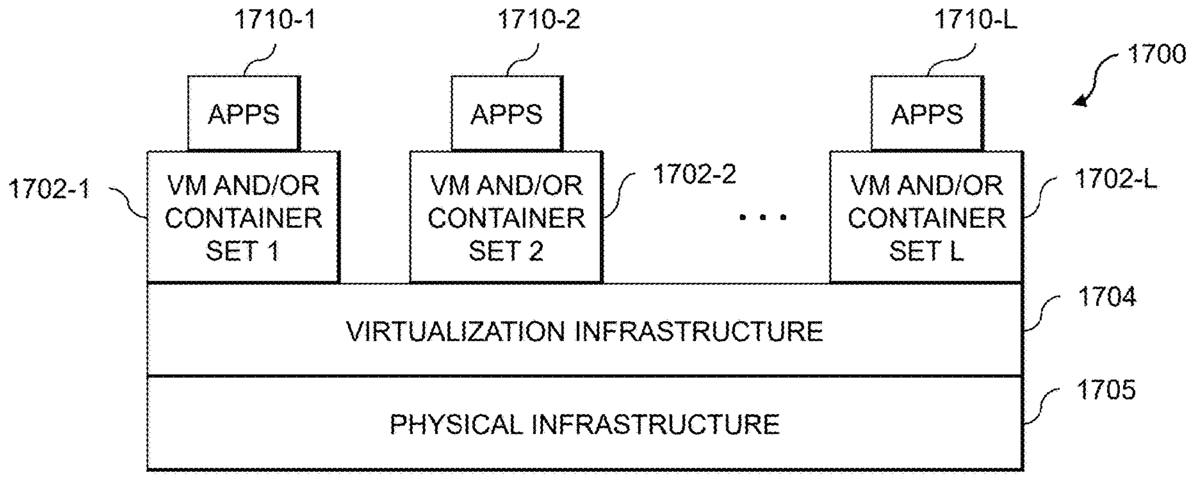
FIGS. 17 and 18 show examples of processing platforms that may be utilized to implement at least a portion of an information processing system in illustrative embodiments.
Figure 18:
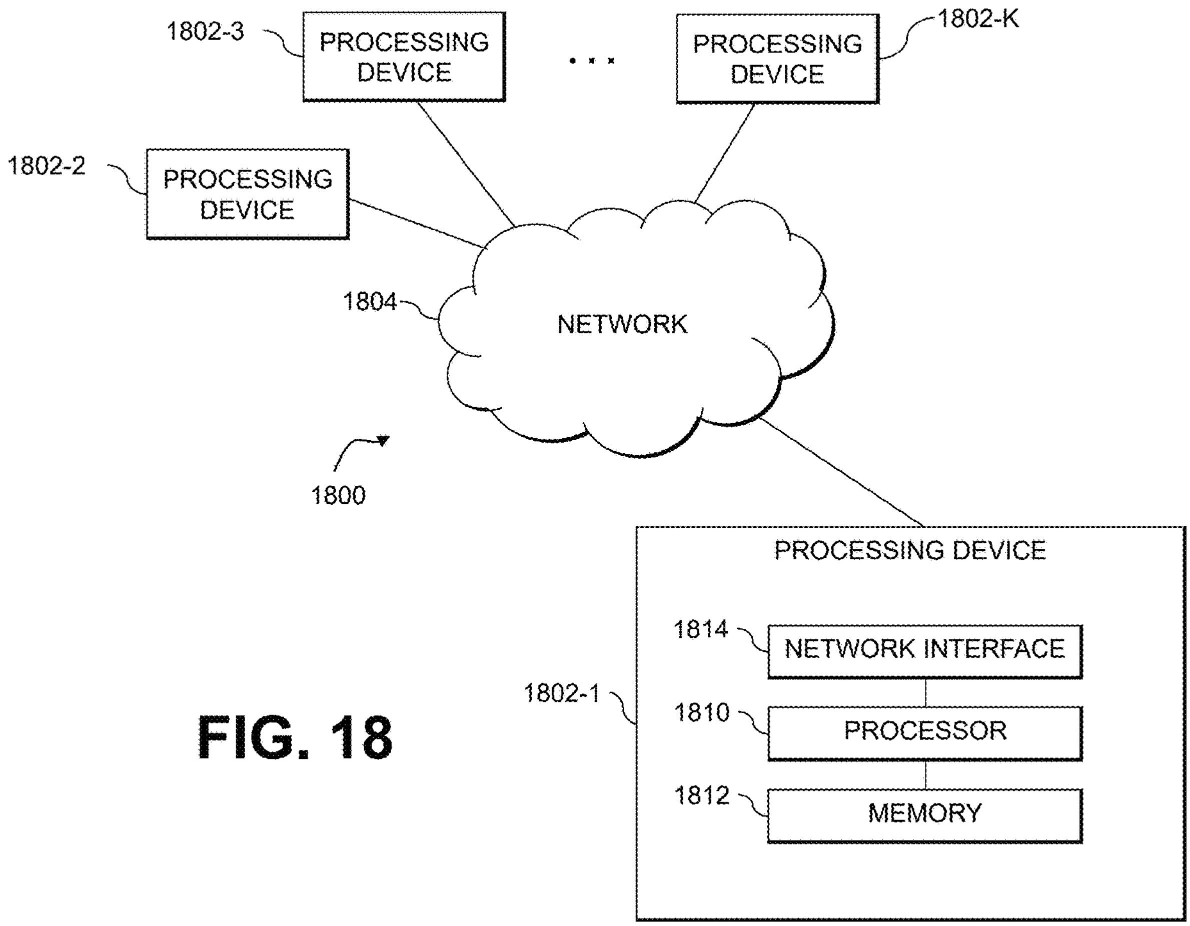

FIG. 17 shows an example processing platform comprising cloud infrastructure 1700. The cloud infrastructure 1700 comprises a combination of physical and virtual processing resources that may be utilized to implement at least a portion of the information processing system 100 in FIG. 1. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling deployment of software utilizing machine learning-based software defect prediction as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to generate a first data structure comprising a set of features characterizing software defects encountered for one or more pieces of software over a first period of time and software stories generated for the one or more pieces of software over the first period of time, the software stories comprising natural language descriptions of one or more portions of the one or more pieces of software developed over the first period of time;

to generate, utilizing at least one time series forecasting machine learning model that takes as input at least a portion of the first data structure, a second data structure characterizing predicted software defects for the one or more pieces of software over a second period of time; and to control deployment, during at least a portion of the second period of time, of at least one of the one or more pieces of software on one or more information technology assets of an information technology infrastructure based at least in part on at least a portion of the second data structure;

wherein the set of features comprises, for a given one of the one or more pieces of software, a ratio of (i) a number of software defects encountered on the given piece of software during a first time frame to (ii) a number of software stories having one or more designated status values during a second time frame, the second time frame being longer than the first time frame.

2. The apparatus of claim 1 wherein the one or more designated status values comprise closed, deployed and waiting to deploy.

3. The apparatus of claim 1 wherein the set of features further comprises, for the given piece of software, an average of a weighted sum of complexities of the software stories, associated with different categories, having the one or more designated status values during a given time frame.

4. The apparatus of claim 3 wherein the different categories correspond to different natures of the software stories.

5. The apparatus of claim 3 wherein the different categories comprise at least two of user, technical debt, configuration, enhancement, architecture, user interface, user experience, testing only, brainstorming, security remediation, and bug tracking.

6. The apparatus of claim 1 wherein the set of features further comprises, for the given piece of software, information characterizing sentiment of one or more of the software stories associated with the given piece of software and having the one or more designated status values during a given time frame, the information characterizing sentiment being determined utilizing a generative artificial intelligence powered natural language processing machine learning model.

7. The apparatus of claim 6 wherein the generative artificial intelligence powered natural language processing machine learning model comprises a Bidirectional Encoder Representations from Transformers (BERT) machine learning model.

8. The apparatus of claim 1 wherein the at least one time series forecasting machine learning model comprises a multilayer perceptron machine learning model for univariate time series forecasting.

9. The apparatus of claim 1 wherein the at least one time series forecasting machine learning model comprises a Neural Basis Expansion Analysis for Interpretable Time Series Forecasting (N-BEATS) machine learning model.

10. The apparatus of claim 1 wherein controlling deployment of said at least one of the one or more pieces of software on the one or more information technology assets of the information technology infrastructure comprises adjusting one or more resources allocated for software development of said at least one of the one or more pieces of software prior to the deployment of said at least one of the one or more pieces of software on the one or more information technology assets of the information technology infrastructure during said at least a portion of the second period of time.

11. The apparatus of claim 1 wherein controlling deployment of said at least one of the one or more pieces of software on the one or more information technology assets of the information technology infrastructure comprises generating a testing plan for testing of said at least one of the one or more pieces of software prior to the deployment of said at least one of the one or more pieces of software on the one or more information technology assets of the information technology infrastructure during said at least a portion of the second period of time.

12. The apparatus of claim 1 wherein the first time frame is a day and the second time frame is a quarter of a year.

13. The apparatus of claim 1 wherein the set of features further comprises, for the given piece of software, at least one complexity feature characterizing how an average complexity of the software stories during the second time frame affects the number of defects encountered per instance of the first time frame in the second time frame.

14. The apparatus of claim 1 wherein the set of features comprises, for the given piece of software, a ratio of (i) the number of software defects encountered on the given piece of software during the first time frame and a complexity of software stories having the one or more designated status values during the second time frame to (ii) the number of the software stories having the one or more designated status values during the second time frame.

15. The apparatus of claim 14 wherein the complexity of a given one of the software stories having the one or more designated status values is based at least in part on a number of story points in the given software story.

16. A computer program product comprising a non-transitory processor-readable storage medium having stored therein program code of one or more software programs, wherein the program code when executed by at least one processing device causes the at least one processing device:

to generate a first data structure comprising a set of features characterizing software defects encountered for one or more pieces of software over a first period of time and software stories generated for the one or more pieces of software over the first period of time, the software stories comprising natural language descriptions of one or more portions of the one or more pieces of software developed over the first period of time;

to generate, utilizing at least one time series forecasting machine learning model that takes as input at least a portion of the first data structure, a second data structure characterizing predicted software defects for the one or more pieces of software over a second period of time; and to control deployment, during at least a portion of the second period of time, of at least one of the one or more pieces of software on one or more information technology assets of an information technology infrastructure based at least in part on at least a portion of the second data structure;

wherein the set of features comprises, for a given one of the one or more pieces of software, a ratio of (i) a number of software defects encountered on the given piece of software during a first time frame to (ii) a number of software stories having one or more designated status values during a second time frame, the second time frame being longer than the first time frame.

17. The computer program product of claim 16 wherein the set of features comprises, for the given piece of software:

an average of a weighted sum of complexities of the software stories, associated with different categories, having the one or more designated status values during a given time frame; and information characterizing sentiment of one or more of the software stories associated with the given piece of software and having the one or more designated status values during the given time frame, the information characterizing sentiment being determined utilizing a generative artificial intelligence powered natural language processing machine learning model.

18. A method comprising:

generating a first data structure comprising a set of features characterizing software defects encountered for one or more pieces of software over a first period of time and software stories generated for the one or more pieces of software over the first period of time, the software stories comprising natural language descriptions of one or more portions of the one or more pieces of software developed over the first period of time;

generating, utilizing at least one time series forecasting machine learning model that takes as input at least a portion of the first data structure, a second data structure characterizing predicted software defects for the one or more pieces of software over a second period of time; and controlling deployment, during at least a portion of the second period of time, of at least one of the one or more pieces of software on one or more information technology assets of an information technology infrastructure based at least in part on at least a portion of the second data structure;

wherein the set of features comprises, for a given one of the one or more pieces of software, a ratio of (i) a number of software defects encountered on the given piece of software during a first time frame to (ii) a number of software stories having one or more designated status values during a second time frame, the second time frame being longer than the first time frame; and wherein the method is performed by at least one processing device comprising a processor coupled to a memory.

19. The method of claim 18 wherein the set of features comprises, for the given piece of software:

an average of a weighted sum of complexities of the software stories, associated with different categories, having the one or more designated status values during a given time frame; and information characterizing sentiment of one or more of the software stories associated with the given piece of software and having the one or more designated status values during the given time frame, the information characterizing sentiment being determined utilizing a generative artificial intelligence powered natural language processing machine learning model.

20. The method of claim 18 wherein the one or more designated status values comprise closed, deployed and waiting to deploy.

* * * * *